(12) United States Patent
Amada et al.

(10) Patent No.: US 8,813,594 B2
(45) Date of Patent: Aug. 26, 2014

(54) RACK AND PINION STEERING GEAR UNIT

(75) Inventors: Shinya Amada, Gunma (JP); Toshiyuki Arai, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/574,480

(22) PCT Filed: May 14, 2012

(86) PCT No.: PCT/JP2012/062294
§ 371 (c)(1),
(2), (4) Date: Oct. 19, 2012

(87) PCT Pub. No.: WO2012/157605
PCT Pub. Date: Nov. 22, 2012

(65) Prior Publication Data
US 2013/0036845 A1   Feb. 14, 2013

(30) Foreign Application Priority Data

May 13, 2011   (JP) .................................. 2011-108238
Mar. 13, 2012  (JP) .................................. 2012-055436

(51) Int. Cl.
*F16H 35/00* (2006.01)
*F16H 55/28* (2006.01)
*B62D 3/12* (2006.01)

(52) U.S. Cl.
CPC .............. *B62D 3/123* (2013.01); *F16H 55/285* (2013.01)
USPC ...................................................... 74/388 PS

(58) Field of Classification Search
USPC .............................................. 74/388 PS, 422
See application file for complete search history.

(56) References Cited

U.S. PATENT DOCUMENTS

| | | | | |
|---|---|---|---|---|
| 4,651,585 A | * | 3/1987 | Donn et al. ...................... | 74/422 |
| 4,724,717 A | * | 2/1988 | Chikuma ........................ | 74/498 |
| 4,794,809 A | * | 1/1989 | Kobayashi et al. ............. | 74/422 |
| 5,058,448 A | | 10/1991 | Kiyooka et al. | |
| 5,983,742 A | | 11/1999 | Morris et al. | |
| 6,467,366 B1 | * | 10/2002 | Gierc .............................. | 74/422 |
| 2005/0257635 A1 | * | 11/2005 | Damore et al. .................. | 74/422 |
| 2008/0156573 A1 | | 7/2008 | Amada | |

FOREIGN PATENT DOCUMENTS

| | | |
|---|---|---|
| JP | 61-124471 | 8/1986 |
| JP | 2-49782 | 4/1990 |
| JP | 3-193556 | 8/1991 |
| JP | 11-286277 | 10/1999 |
| JP | 2001-260906 | 9/2001 |

(Continued)

OTHER PUBLICATIONS

International Search Report dated May 14, 2012, from corresponding International Application No. PCT/JP2012/062294.

*Primary Examiner* — Justin Krause
(74) *Attorney, Agent, or Firm* — Katten Muchin Rosenman LLP

(57) ABSTRACT

A rack and pinion steering gear unit is achieved that is capable of preventing an increase in operating force of the steering wheel and auxiliary operating force from a motor, and improving the response performance to minute operation when traveling straight. A pressing roller 34 elastically pushes the rear surface 29 of a rack shaft 9 toward a pinion shaft 5. This pressing roller 34 is supported by way of a radial needle bearing 16a by a support shaft 33 that is supported by and fastened to a holder 30 so as to be able to rotate freely. A thrust needle bearing 35 that receives a thrust load that is applied to the pressing roller 34 is provided between both side surfaces in the axial direction of the pressing roller 34 and the inside surface of the holder 30.

2 Claims, 10 Drawing Sheets

(56) References Cited

FOREIGN PATENT DOCUMENTS

| | | |
|---|---|---|
| JP | 2004-17872 | 1/2004 |
| JP | 2006-282103 | 10/2006 |
| JP | 2007-62397 | 3/2007 |
| JP | 2008-169862 | 7/2008 |
| JP | 2009-184591 | 8/2009 |

* cited by examiner

RACK AND PINION STEERING GEAR UNIT

TECHNICAL FIELD

The present invention relates to a rack and pinion steering gear unit of a steering apparatus for applying a steering angle to steered wheels of an automobile, and particularly to a rack and pinion steering gear unit that employs a rolling-type rack guide.

BACKGROUND ART

A rack and pinion steering gear unit is used as a mechanism that converts rotating motion that is inputted from a steering wheel to linear motion for applying a steering angle. A steering apparatus that comprises a rack and pinion steering gear unit is well known, and is disclosed in JP2009-184591(A), JP2004-17872(A) and JP61-124471(U).

FIG. 7 illustrates an example of a steering apparatus in which a rack and pinion steering gear unit is assembled. This steering apparatus is a so-called column assist type rack and pinion power steering apparatus. In other words, in order to reduce the operating force for operating the steering wheel 1, auxiliary operating force from a motor 3 that is attached to the middle section of the steering column 2 is applied to the steering shaft. Movement of the steering shaft that rotates as the steering wheel 1 is operated is transmitted to an intermediate shaft 4, and by way of a pinion shaft 5, causes the rack shaft of the rack and pinion steering unit 6 to reciprocate, which steers the steered wheels by way of a pair of left and right tie rods.

On the other hand, FIG. 8 illustrates a so-called pinion assist type rack and pinion power steering apparatus. That is, the operating force for operating the steering wheel 1 is reduced by applying auxiliary operating force from a motor attached to a housing of the steering gear unit 6 to the pinion shaft 5.

Even in column assist or pinion assist type rack and pinion power steering apparatus, the steering gear unit 6, as illustrated in FIG. 9 and FIG. 10, is constructed such that the pinion gear 8 that is formed on part (tip end half) in the axial direction of the pinion shaft 5 engages with the rack teeth 10 that are formed on the front surface of the rack shaft 9 (surface on the top side of FIG. 9 and FIG. 10). A helical rack having a twist angle is used as the rack gear 10, and a helical gear having a twist angle that corresponds to that of the helical rack is used as the pinion gear 8. Part of both the pinion shaft 5 and the rack shaft 9 are housed inside a housing 11.

The housing 11 comprises a main housing section 12 and a sub housing section 13 that are both cylindrical shaped. The main housing section 12 is such that both ends are open, and the sub housing section 13 is provided on the side of part of the main housing section 12, and is such that one end is open. The center axis of the main housing section 12 and the center axis of the sub housing section 13 are in a twisted relationship with each other. The rack shaft 9 is inserted through the main housing section 12 such the displacement in the axial direction is possible, and both end sections thereof protrude from the main housing section 12.

A pair of rack bushings (sliding bearings) 14 that are supported by the portions near both ends of the inner circumferential surface of the main housing section 12 come in sliding contact with the outer circumferential surface of the rack shaft 9, and the rack shaft 9 is able to displace in the axial direction with respect to the main housing section 12 with no backlash movement. The base end sections of a pair of tie rods 7 are connected to both end sections of the rack shaft 9 by way of spherical joints 15. The tip end sections of each tie rod 7 are connected to the tip end sections of knuckle arms (not illustrated in the figure) by a pivot shaft. Due to engagement between the pinion teeth 8 and the rack teeth 10, the rack 9 does not rotate around the center axis of the rack shaft 9.

Due to a reaction force that occurs in the engaging section between the pinion teeth 8 and rack teeth 10 during operation of the steering gear unit 6, a force is applied in a direction that would separate the rack shaft 9 from the pinion shaft 5. Therefore, a mechanism (rack guide) is provided that supports the back surface side of the rack shaft 9, which is the side opposite from the engaging section between the pinion teeth 8 and rack teeth 10, and this mechanism prevents the rack shaft 9 from displacing in a direction away from the pinion shaft 5.

A cylinder section 20 is provided in the housing 11 in the portion in the radial direction of the sub housing section 12 that is on the opposite side from the sub housing section 13, and a rack guide is provided inside the cylinder section 20. For the rack guide, there is a sliding-type rack guide and a rolling-type rack guide. Of these, a sliding-type rack guide 28 that is disclosed in JP2009-184591(A) (FIG. 9 and FIG. 10) comprises: a pressing block 21 that fits inside the cylinder section 20, which on the side that presses the rack shaft 9, has a partial cylindrical concave surface that corresponds to the shape of the back surface of the rack shaft 9; a cover 22 that is screwed onto the opening section of the cylinder section 20; and an elastic section such as a spring 23 or the like that is provided between the pressing block 21 and the cover 22, and is such that the pressing block 21 presses toward the rack shaft 9.

With this construction, together with eliminating backlash in the engaging section between the pinion teeth 8 and the rack teeth 10, it is possible to properly maintain an engaged state between the pinion teeth 8 and the rack teeth 10 regardless of a force that is applied to the rack shaft 9 in a direction away from the pinion shaft 5 as power is transmitted at the engaging section between the pinion teeth 8 and rack teeth 10. In this sliding-type rack guide 28, the partial cylindrical concave surface of the pressing block 21 presses the back surface of the rack shaft 9, so contact between the pressing block 21 and the rack shaft 9 becomes surface contact, and it is possible to effectively prevent backlash movement in the width direction of the rack shaft 9, however, the friction resistance at the area of contact become comparatively large.

On the other hand, a rolling-type rack guide is disclosed in JP2004-17872(A) and JP61-124471(U). In the rolling-type rack guide, by pressing the back surface of the rack shaft with the outer circumferential surface of a pressing roller, backlash in the engaging section between the pinion teeth and the rack teeth is eliminated. In the case of this rolling-type rack guide, the contact state between the pressing roller and the rack shaft is line contact, and it is possible to make the friction resistance at the area of contact comparatively small. Even in the case of a rolling-type rack guide, due to the engagement between the pinion teeth and the rack teeth, a radial load and a thrust load are applied to the pressing roller that presses the back surface of the rack shaft. Therefore, in order to allow the rack shaft to displace smoothly in the axial direction, it is necessary to support the radial load and thrust load that are applied to the pressing roller.

The rack and pinion of steering gear unit that is disclosed in JP2004-17872(A), together with comprising a pair of inclined surfaces on the back surface of the rack shaft that incline in different directions, comprises a pressing roller that is divided into two and that has tapered surfaces that come in contact with each of these inclined surfaces, a support shaft (pin) that supports both ends of the pressing roller such that the pressing roller can rotate freely, and a plate spring that presses the pressing roller in the axial direction; and by pressing the tapered surfaces of the pressing roller against the inclined surfaces of the rack shaft, backlash in the engaging section between the pinion teeth and the rack teeth is eliminated. In this construction, the pressing roller that is divided into two is pressed in the axial direction, so a thrust needle roller bearing is provided between the side surface in the axial direction of the pressing roller and the inside surface of the cylinder section.

In this construction, the inclined surfaces of the rack shaft are pressed in the axial direction of the rack shaft, so the rack shaft may incline with respect to the axis line. Moreover, there is a possibility that manufacturing error will occur between the tapered surfaces of the pressing roller that is divided into two, or that a space will occur between the inner circumferential surface of the pressing roller and the outer circumferential surface of the support shaft. Therefore, in the case of this construction, due to these phenomena, it is not possible to properly maintain a state of engagement in the engaging section between the pinion teeth and the rack teeth, and as a result, there is a possibility that fluctuation will occur in the operation force of the steering wheel, the operator will have an uncomfortable feeling when operating the steering wheel. When the amount that the engagement state in the engaging section between the pinion teeth and the rack teeth shifts from the proper state is excessive, there is also a possibility that partial damage may occur in this engaging section.

FIG. 11 illustrates a rolling-type rack guide 28a that is disclosed in JP61-124471(U). This rolling-type rack guide 28a comprises: a pressing roller 34 having a partial cylindrical concave surface in the circumferential direction that matches the shape of the back surface of the rack 9, a support shaft (pin) 33 that supports the pressing roller 34 so as to be able to rotate freely, a holder 30 for supporting the support shaft 33 on the inside of the cylinder section 20a, and a plate spring 31 that presses the holder 30 in the direction of the rack shaft 10; and by pressing the pressing roller 34 against the back surface of the rack shaft 9, eliminates backlash in the engaging section between the pinion teeth 8 and the rack teeth 10. In this construction, radial loads are supported by a radial needle roller bearing 19 that is provided between the inner circumferential surface of the pressing roller 34 and the outer circumferential surface of the support shaft 33, and thrust loads are supported by a thrust metal bearing 18 that is provided between the inside surface of the holder (support) 30 that supports and secures both end sections in the axial direction of the support shaft 33 and both outside surfaces in the axial direction of the pressing roller 34.

RELATED LITERATURE

Patent Literature

[Patent Literature 1] JP2009-184591(A)
[Patent Literature 2] JP2004-17872(A)
[Patent Literature 3] JP61-124471(U)

SUMMARY OF THE INVENTION

Problem to be Solved by the Invention

In the construction of the rolling-type rack guide illustrated in FIG. 11, a force is not applied in the axial direction to the pressing roller 34, so the thrust load on the pressing roller 34 is supported by the thrust metal bearing. However, in a rack and pinion of steering gear unit that uses this construction, particularly in the case of a combination of a helical rack and helical gear is employed, there is a possibility that the operating force of the steering wheel and the auxiliary operating force that is provided by electric motor will become large, or the return performance of the steering wheel will decrease, so response performance to minute steering when traveling straight will decrease.

Taking the situation above into consideration, it is the object of the present invention to provide a rack and pinion steering gear unit that is capable of preventing an increase in friction resistance due to a thrust load that is applied to the pressing roller that presses the rack shaft, is capable of prevent an increase in the operating force of the steering wheel and the auxiliary operating force of the electric motor, and is capable of improving the response performance to minute steering when traveling straight.

Means for Solving the Problems

The rack and pinion steering gear unit of the present invention has a housing, a rack shaft, a pinion shaft and a rack guide.

The housing has a cylindrical main housing section that is open on both ends, a cylindrical sub housing section that is provided in a twisted position with respect to the main housing and is open on one end, and a cylinder section that is provided on the opposite side in the radial direction of the main housing section from the sub housing section and in a direction orthogonal to the main housing section so as to communicate inside and outside of the main housing section.

The rack shaft has rack teeth on part of the front surface that are inclined with respect to the width direction of the front surface, and that is located inside the main housing section such that displacement in the axial direction is possible. The pinion shaft has pinion teeth on half of the tip end section in the axial direction that engage with the rack teeth. The pinion shaft is located inside the sub housing section such that rotation thereof is possible, with the pinion teeth being engaged with the rack teeth and the base section in the axial direction protruded to the outside from the opening of the sub housing section.

The rack guide is located inside the cylinder section so as to be able to press the rack shaft toward the pinion shaft. Particularly, in the present invention the rack guide is a rolling-type rack guide and comprises: a pressing roller that has an outer circumferential surface that comes in rolling contact with the rear surface of the rack shaft; a support shaft that supports the pressing roller such that rotation is possible; a holder that is mounted inside the cylinder section such that the movement toward or away from the rack shaft is possible, and supports both end sections in the axial direction of the support shaft; an elastic member that presses the holder toward the rear surface of the rack shaft; a radial needle roller bearing that is provided between the outer circumferential surface of the support shaft and the inner circumferential surface of the pressing roller; and a thrust needle roller bearing that is provided between both side surfaces in the axial direction of the pressing roller and the inside surface of the holder.

The rack and pinion steering gear unit also preferably further comprises a rack bushing that is entirely cylindrical, and that comprises a support section that supports the rack shaft on the inside thereof and from both sides in the width direction such that sliding movement of the rack shaft is possible, and that is fastened in part of the inside of the main housing section in a location that is separated from the engaging section between the rack teeth and the pinion teeth, but is near this engaging section.

Preferably, the end section on the rack shaft side of the holder extends on both sides of the pressing roller to the rack shaft side further than outer diameter of the pressing roller, and contact sections are formed on this end section on the rack shaft side that extend in the axial direction of the rack shaft and come in contact with or closely face both sides in the width direction of the rear surface of the rack shaft.

Effect of the Invention

With the rack and pinion steering gear unit of the present invention, a rolling-type rack guide is able to prevent an increase in friction resistance due to a thrust load that is applied to the pressing roller that pushes the rack shaft, is able to prevent an increase in operating force of the steering wheel and auxiliary operating force of an electric motor, and is able to improve response performance to minute operation when traveling straight or the like.

In other words, a thrust roller bearing that is provided between both sides in the axial direction of the pressing roller and the inside surface of the rack guide supports thrust loads that are applied to the pressing roller. Therefore, when compared with the case of supporting thrust loads that are applied to the pressing roller by a thrust metal bearing as in the construction disclosed in JP61-124471(U), it is possible to greatly reduce friction resistance. As a result, when the thrust load that is applied to the pressing roller is large, it is possible to reduce the operating force of the steering wheel or the auxiliary operating force from an electric motor. On the other hand, when the thrust load on the pressing roller is small such as when traveling straight, it is possible to improve the response performance to minute operation.

In the preferred form of the present invention, a mechanism is provided that supports the rack shaft from both sides in the width direction, and during operation, is able to prevent tilting and backlash movement of the rack shaft with respect to the holder and pressing roller of the rack guide, and is able to make it easier to maintain a proper state of engagement in the engaging section between the pinion teeth and rack teeth.

MODES FOR CARRYING OUT THE INVENTION

Example 1

Figure 1:
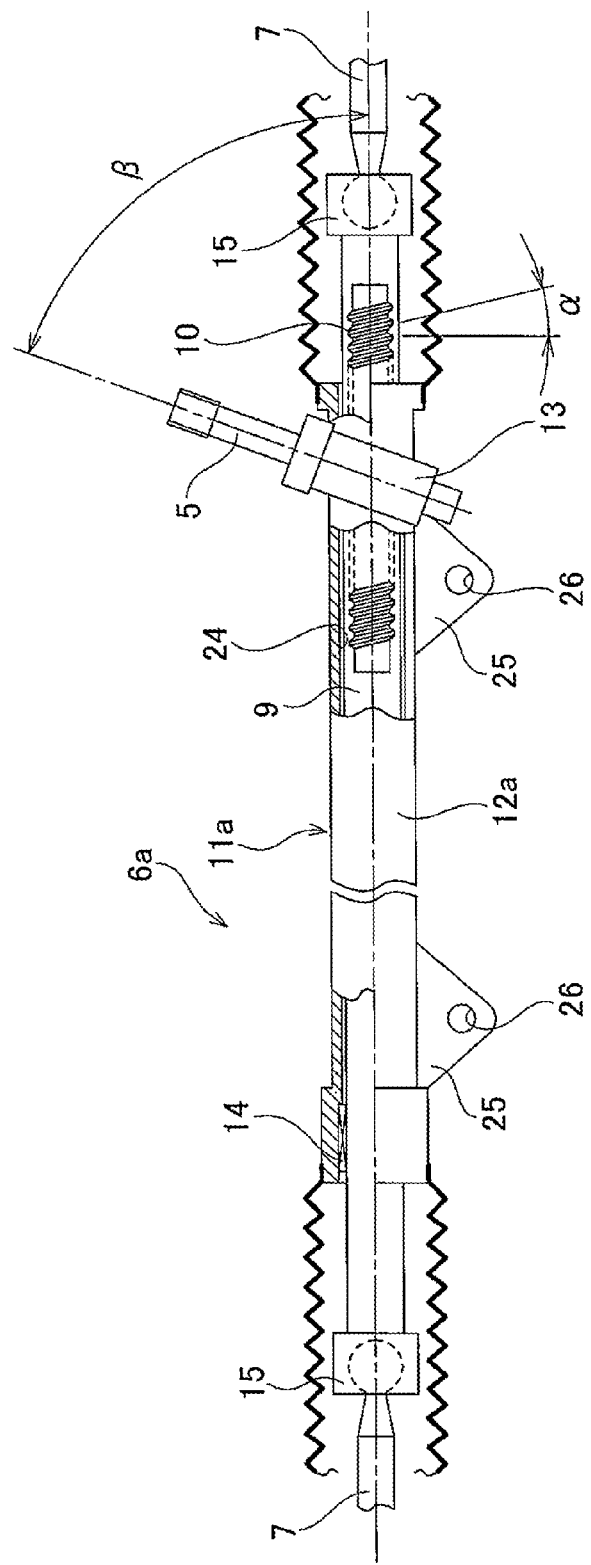
FIG. 1 is a front view with a partial cross-sectional view illustrating a steering gear of a steering gear unit of a first example of an embodiment of the present invention.
Figure 2:
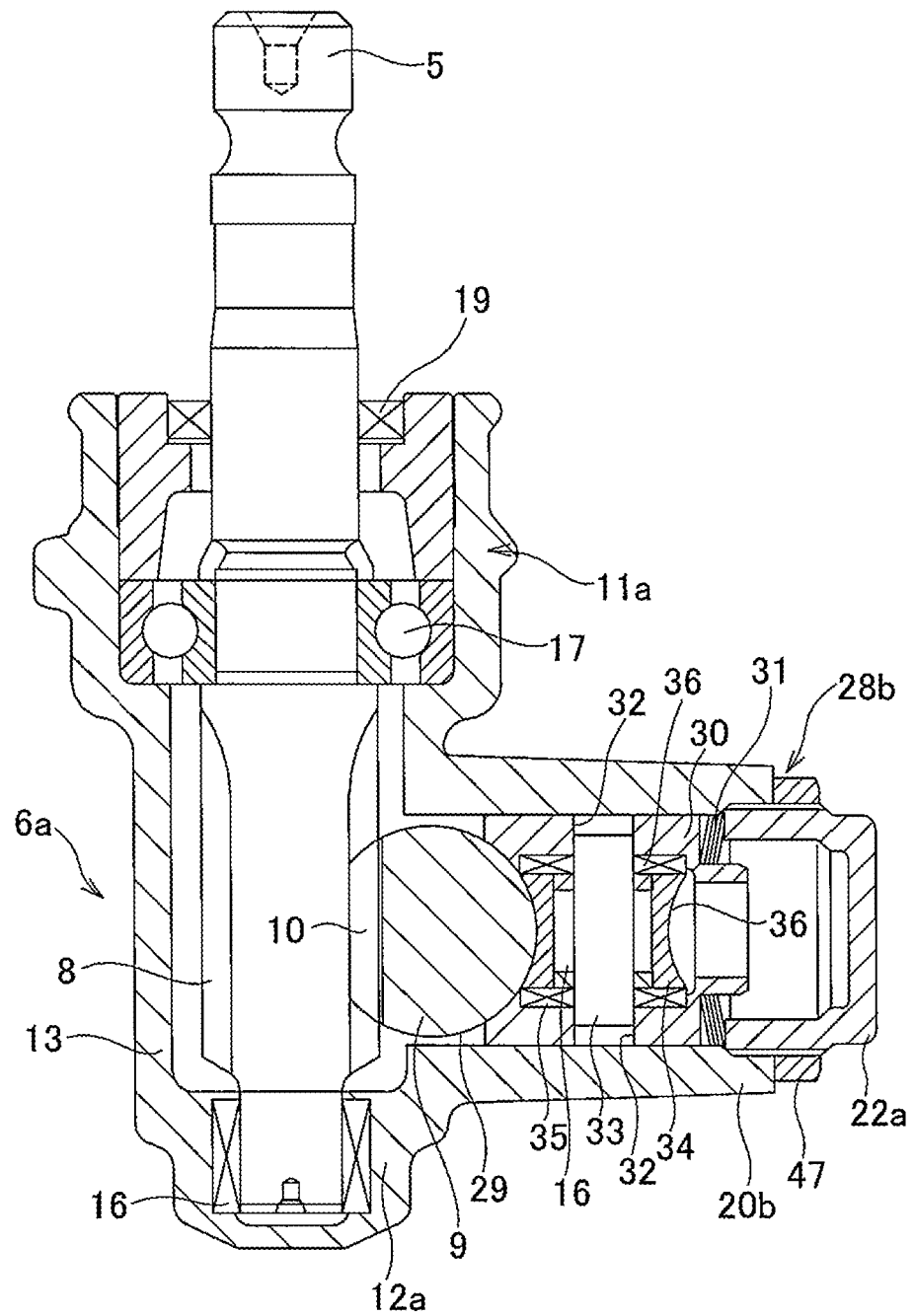
FIG. 2 is a drawing that corresponds to FIG. 10 of the first example.
Figure 3:
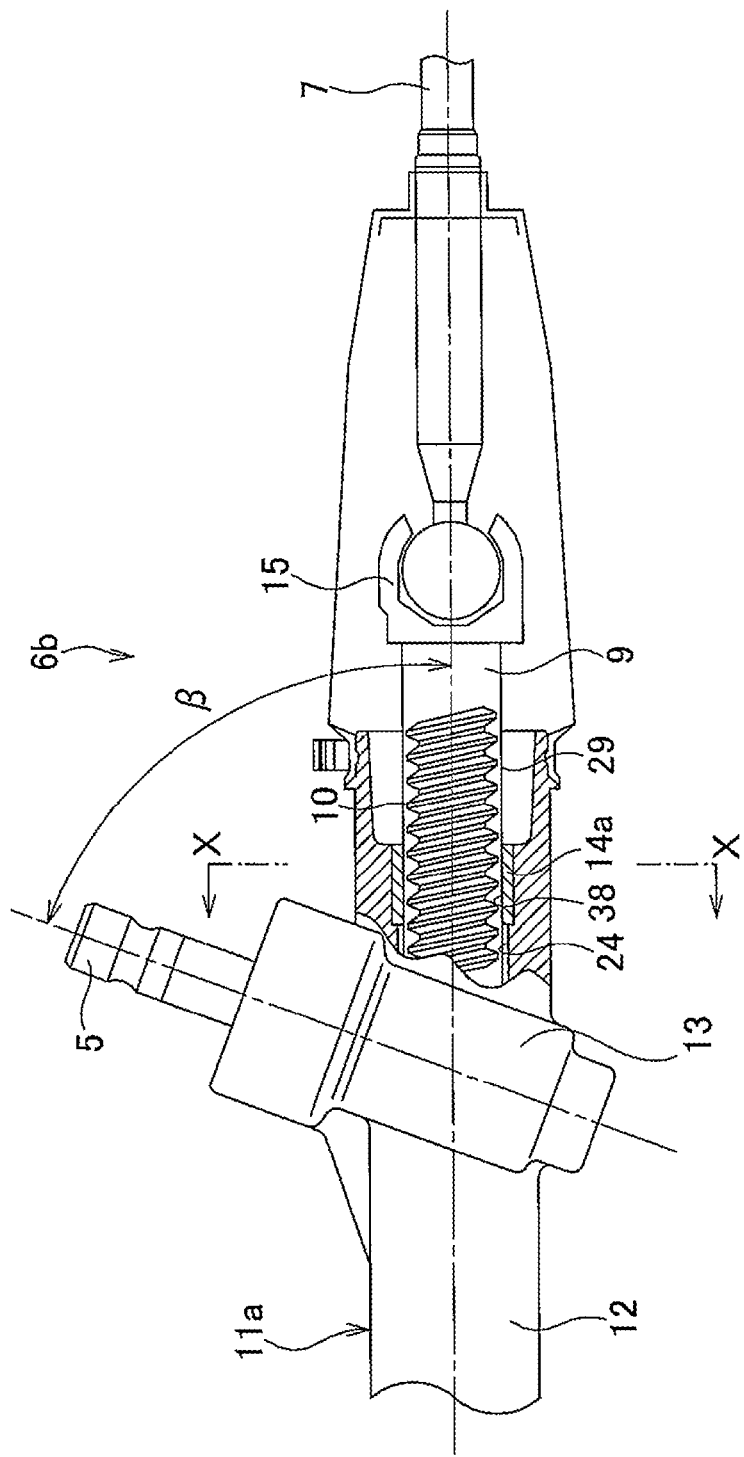
FIG. 3 is a drawing that corresponds to an enlarged view of the left portion of FIG. 1, and illustrates a second example of an embodiment of the present invention.
Figure 4:
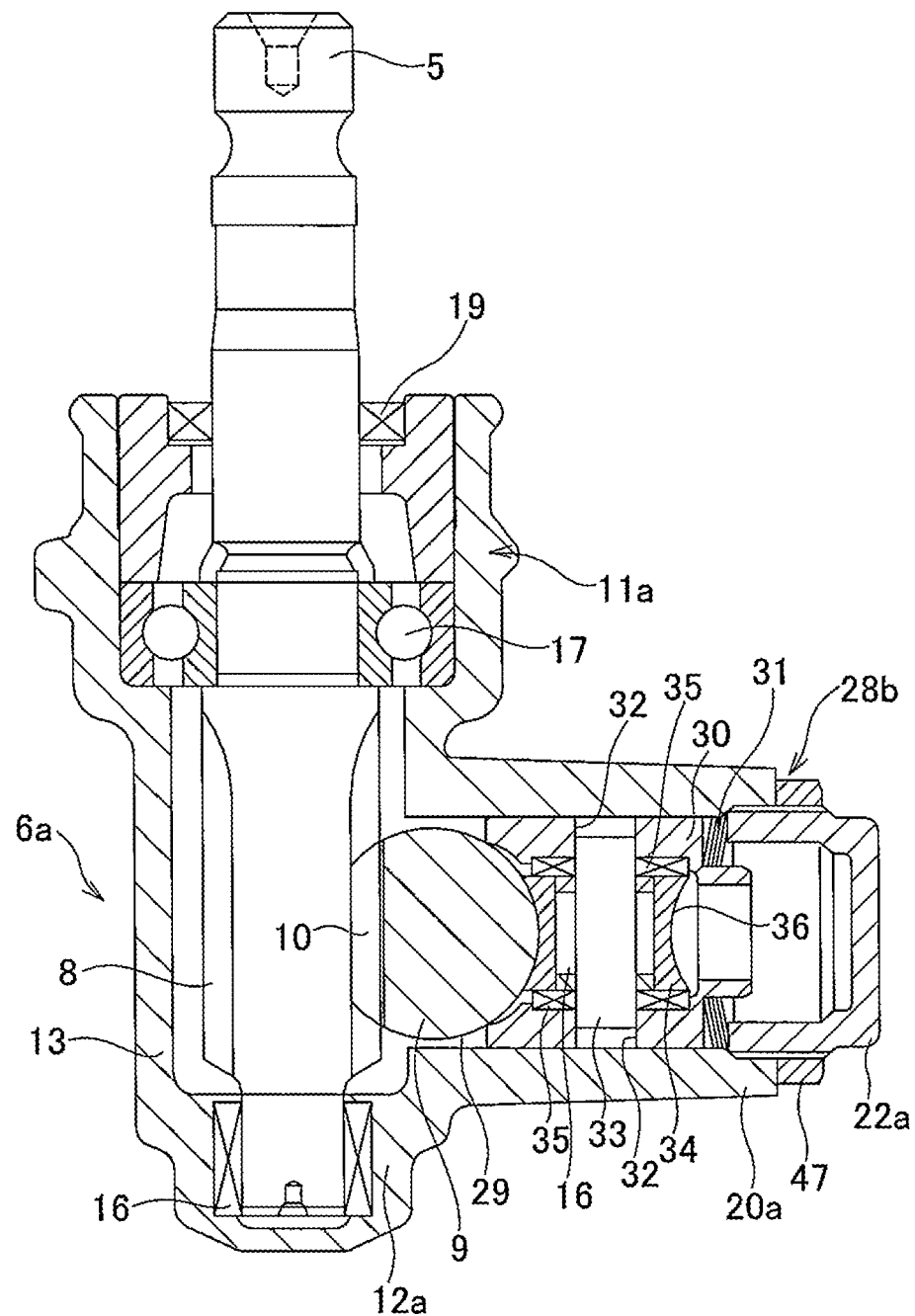
FIG. 4 is a drawing similar to FIG. 2 of the second example.
Figure 5:
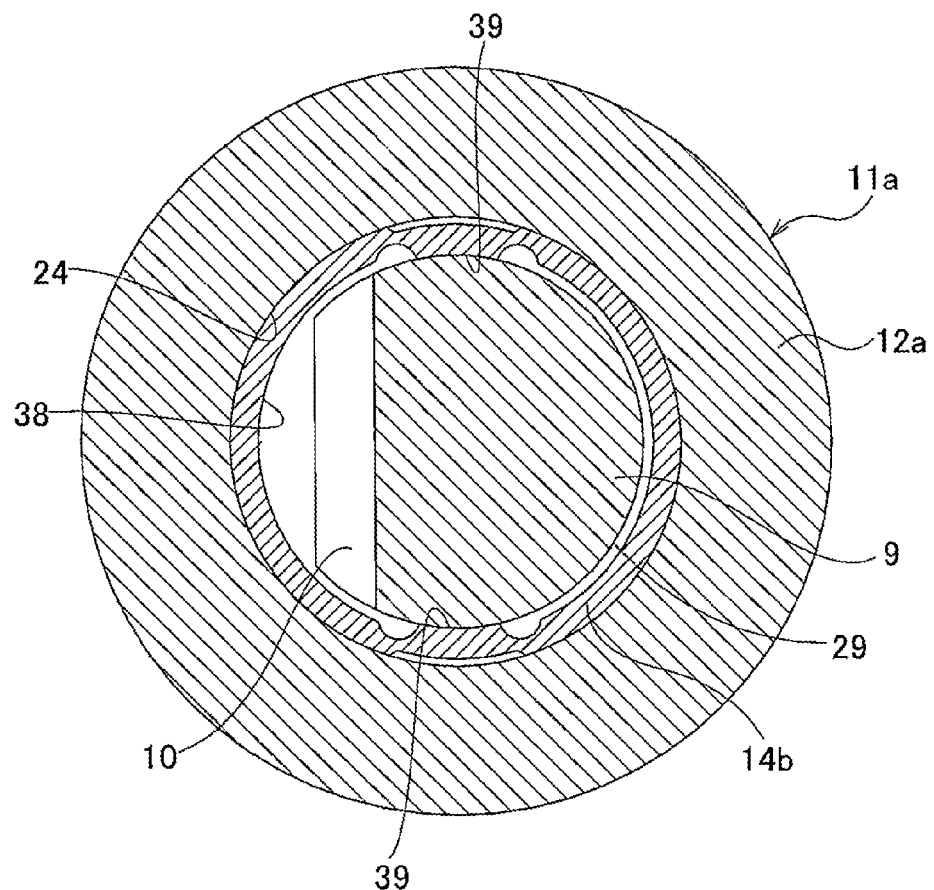
FIG. 5 is a cross-sectional view of section X-X in FIG. 3.
Figure 6:
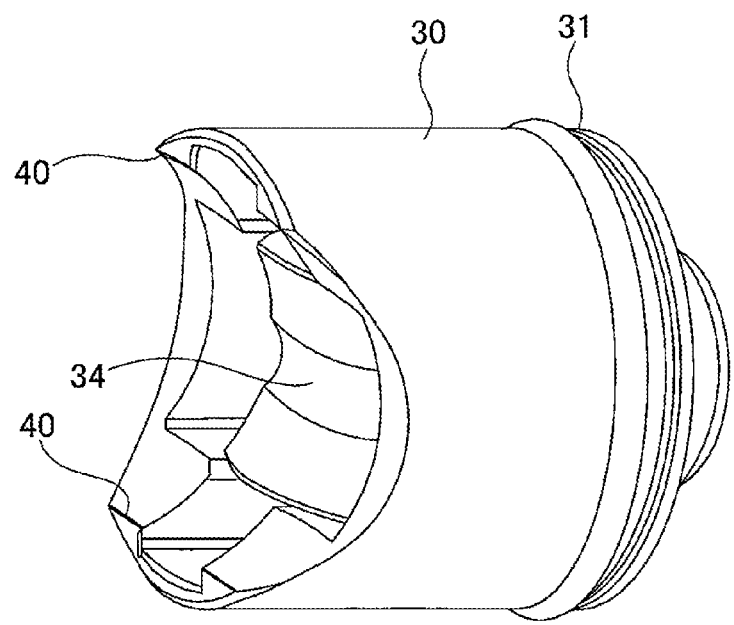
FIG. 6 is a perspective view illustrating a holder that has been removed from a steering gear unit of the second example of an embodiment of the present invention.

FIG. 1 and FIG. 2 illustrate a first example of an embodiment of the present invention. The steering gear unit 6a of this example is attached to the vehicle frame (not illustrated in the figure) such as the front sub frame. The upward direction in FIG. 1 is the upward side of the vehicle, the downward direction in FIG. 1 is the downward side of the vehicle, the left-right direction in FIG. 1 is the width direction of the vehicle, and the direction orthogonal to the paper surface in FIG. 1 is the forward-backward direction of the vehicle. The material of the rack and pinion of steering gear unit of the present invention, including this example, is not particularly limited, and is the same as the conventional material.

A rack shaft 9a is fitted on the inside of the inner circumferential surface 24 of the main housing section 12a of the housing 11a of the steering gear unit 6a so as to be able to displace in the width direction of the vehicle (axial direction of the rack shaft 9a). In other words, a rack bushing 14 is fitted inside only one end section (left end section in FIG. 1) in the axial direction of the rack shaft 9a of the inner circumferential surface 24 of the housing 11a, and one end section in the axial direction of the rack shaft 9a is inserted through the inner circumferential surface of the rack bushing 14 such that sliding movement of the rack shaft is possible. A spherical joint 15 is formed on both end sections in the axial direction of the rack shaft 9a, and a pair of tie rods 7, the base end sections thereof being connected to these spherical joints 15, is connected to the steering wheels by way of knuckle arms (not illustrated in the figure).

Installation flange sections 25 are formed at two locations in the width direction of the main housing section 12a of the housing 11a. Circular installation holes 26 that pass through in the forward-backward direction of the vehicle are formed in these installation flange sections 25. Bolts (not illustrated in the figure) are passed through these installation holes 26, and these bolts are screwed into threaded holes that are provided in the vehicle frame, or the bolts pass through through holes that are formed in the vehicle frame and screwed into nuts, and then by further tightening, the housing 11a is supported by and fastened to the vehicle body. As the construction of attaching the housing 11a to the vehicle body, the other rigid construction can also be adopted.

The tip end section of the pinion shaft 5 is supported inside the sub housing section 13 of the housing 11a by a radial needle roller bearing 16 and ball bearing 17 so as to be able to rotate. The base end section of the pinion shaft 5 is connected to a universal joint 27, and the movement of the steering shaft that rotates as the steering wheel 1 (see FIG. 7) is operated is transmitted to the pinion shaft 5 by way of the universal joint 27 and an intermediate shaft 4.

The rotation of the pinion shaft 5 is transmitted to the rack shaft 9a by way of the engaging section between the pinion teeth 8 and rack teeth 10, and displacement in the axial direction of the rack shaft 9 applies a steering angle to the steered wheels by way of the pair of tie rods 7. In this example, as illustrated in FIG. 1, rack teeth 10 are formed on the front surface of the rack shaft 9, the rack being a helical rack with a twist angle α. To correspond to this, a helical gear having a twist angle is used for the pinion teeth 8. As a result, the contact ratio in the engaging section between the pinion teeth 8 and the rack teeth 10 is improved, and together with improving the engagement strength of this engaging section, the engagement state between the pinion teeth 8 and the rack teeth 10 is appropriate (smooth engagement).

Moreover, as illustrated in FIG. 1, by locating the pinion shaft 5 in the portion near the middle in the width direction of the vehicle body in a state with the pinion shaft 5 inclined with respect to the rack shaft 9 by an intersection angle β, interference between the tire house that covers the front wheels, which are the steered wheels, and the pinion shaft 5 is prevented. Therefore, due to the twisting angle α and the intersection angle β, both a radial load and a thrust load act on the pressing roller 34 that presses the rear surface side of the rack shaft 9.

In the case of this example, backlash in the engaging section between the pinion teeth 8 and the rack teeth 10 is eliminated by pressing the rear surface 29 of the rack shaft 9 toward the pinion shaft 5 by a rolling-type rack guide 28b that is provided inside the cylinder section 10b of the housing 11a. More specifically, a plate spring 31, which is an elastic member, is provided between a cover 22a that is screwed onto and attached to the opening section of the cylinder section 20b, which is provided in the portion in the radial direction of the main housing section 12a on the opposite side from the sub housing section 13, and a holder 30, which mounted inside the cylinder section 20b such that displacement in the axial direction is possible. It is possible to use an arbitrary elastic member as the elastic member as long as the member can be placed inside the cylinder section 20, and can apply a force to the rack guide 28b.

Support holes 32 are formed at two locations in the middle section in the axial direction of the holder 30, and the pressing roller 34 is supported around a support shaft 33, both end sections in the axial direction thereof being fitted and fastened inside the support holes 32, by way of a radial needle bearing 19 so as to be able to rotate freely. A thrust needle bearing 35 is provided between both side surfaces in the axial direction of the pressing roller 34 and the inside surface of the holder 30. By pressing the outer circumferential surface of the pressing roller 34 against the rear surface 29 of the rack shaft 9 which is a partial cylindrical convex surface, the rack guide 28b presses the rack shaft 9 toward the pinion shaft 5. In order for this, the generating line of the outer circumferential surface 36 of the pressing roller 34 is a semi arc shaped curved surface (hyperboloid) that, except for a little manufacturing error, essentially has the same curvature as the curvature of the rear surface 29 of the rack shaft 9.

In order to make the pressure force that presses the rack shaft 9 toward the pinion shaft 5 appropriate, when assembling the rack guide 28b, the amount that the cover 22a that is screwed onto the opening section of the cylinder section 20b is tightened is adjusted with the holder 30 being mounted inside the cylinder section 20b and with the rear surface 29 of the rack shaft 9 in contact with the outer circumferential surface 36 of the pressing roller 34. As a result, the spring force of the plate spring 31 that presses the holder 30 is adjusted. Then the cover 22a is positioned by screwing a restraining nut 37 onto the cover 22a.

With the rack and pinion of steering gear unit of this example that is constructed as described above, it is possible to suppress the effects of friction resistance due to the radial load and thrust load that are applied to the pressing roller 34 that presses the rack shaft 9. As a result, it is possible to prevent an increase in the steering force of the steering wheel 1 (see FIG. 7 and FIG. 8) and the auxiliary operating force that is provided by the motor 3 (3a), and thus it is possible to improve the reaction performance to minute operation when traveling straight.

Figure 11:
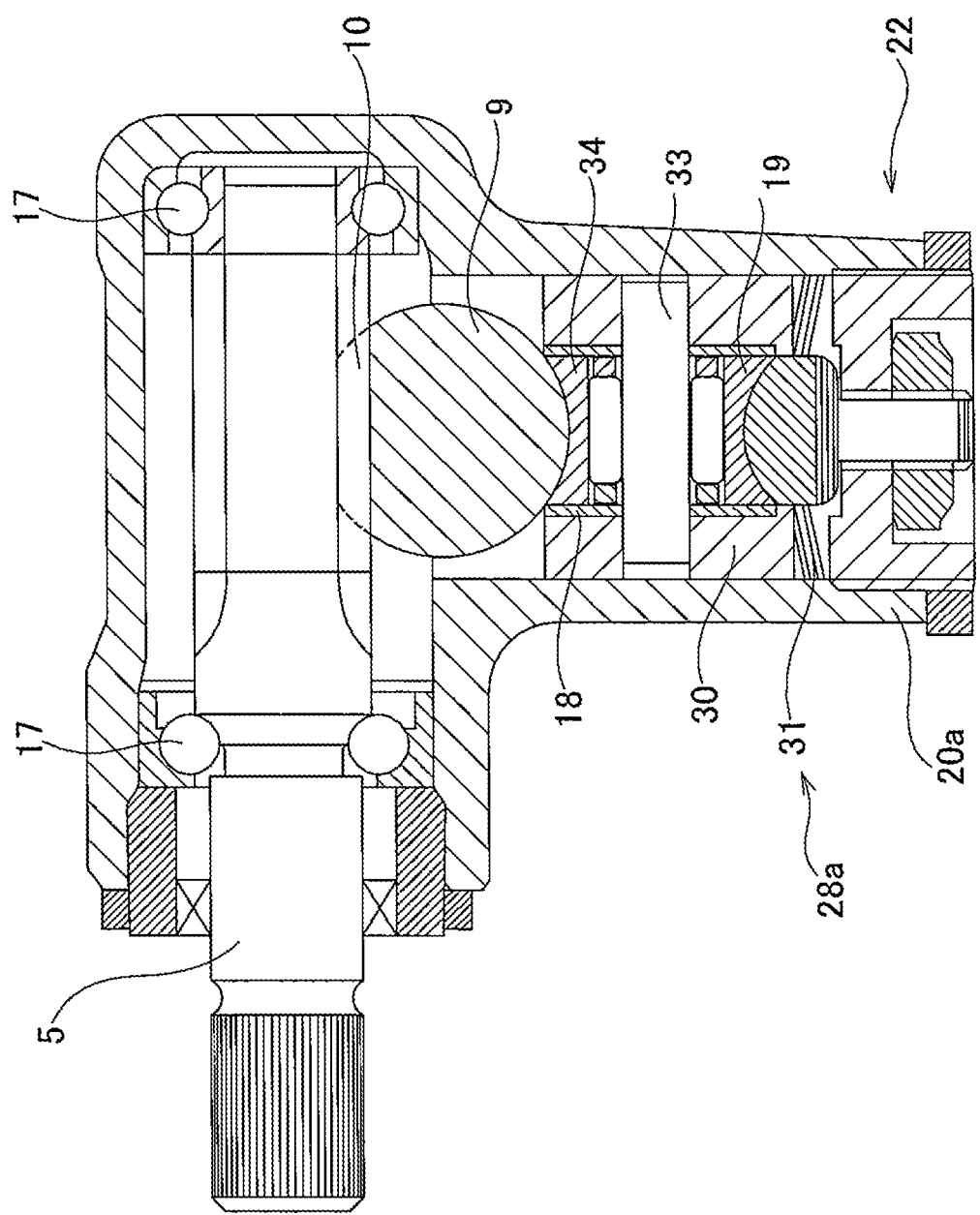
FIG. 11 is a drawing similar to FIG. 10, and illustrates another example of a conventional rack and pinion of steering gear unit.

In other words, in this example, the radial load that is applied to the pressing roller 34 is supported by the radial needle bearing 19 that is provided between the inner circumferential surface of the pressing roller 34 and the outer circumferential surface of the support shaft 33. Moreover, the thrust load that is applied to the pressing roller 34 is supported by the thrust needle bearing 35 that is provided between both side surfaces in the axial direction of the pressing roller 34 and the inside surface of the holder 30. Therefore, when compared with the case of supporting the thrust load that is applied to the pressing roller by a thrust metal bearing as in the construction illustrated in FIG. 11, it is possible to greatly reduce the friction resistance that acts on the pressing roller 34 due to the thrust load.

Example 2

FIG. 3 to FIG. 6 illustrate a second example of an embodiment of the present invention. This example is a variation of the first example described above, and reduces the thrust load that is applied to the pressing roller 34.

In the rack and pinion of steering gear unit 6b of this example, in addition to the construction of the first example, a rack bushing 14a is additionally fitted and fastened in the portion of the inner circumferential surface of the main housing section 12a that is separated from the engaging section between the rack teeth 10 and the pinion teeth 8 and that is adjacent to this engaging section, and the end section in the axial direction of the rack shaft 9 is inserted on the inside of the inner circumferential surface 38 of this rack bushing 14a such that sliding movement is possible. At two locations on opposites sides from each other in the radial direction of the inner circumferential surface 38 of the rack bushing 14a, there are convex sections 39 having inner circumferential surfaces that have a smaller diameter than the surrounding areas. Therefore, when the end section in the axial direction of the rack shaft 9 is inserted on the inside of the inner circumferential surface 38 of the rack bushing 14a, the inner circumferential surface of this pair of convex sections 39 come in contact with the rear surface 29 of the rack shaft 9 from both sides in the width direction of the rack shaft 9. As a result, due to the twisting angle α and intersection angle β, there is particularly a tendency for a force in the width direction to be applied to the rack shaft 9 and to move the rack shaft 9 in the axial direction of the pressing roller 34, however, this rack bushing 14a restrains the movement of the rack shaft 9 in the direction of the thrust load of the pressing roller 34.

In this way, in this example, a rack bushing 14a is proved in the portion adjacent to the engaging section between the pinion teeth 8 and the rack teeth 10, and the end section in the axial direction of the rack shaft 9 is inserted on the inside of the inner circumferential surface 38 of the rack bushing 14 such that sliding movement is possible. Therefore, the rack shaft 9 is prevented from displacing (backlash movement) in the axial direction of the pressing roller 34, and the trust load that is applied to the pressing roller 34 is reduced.

By providing this kind of rack bushing 14a, it is possible to effectively prevent an increase in friction resistance due to the thrust load that is applied to the pressing roller 34 even more than in the first example where a thrust needle roller bearing 35 is provided for receiving the thrust load on the pressing roller 34. The shape of the inner circumferential surface of this rack bush 14b is not limited to that described above, and various construction can be employed. In other words, by making the cross-sectional shape of the inner circumferential surface of the rack bushing 14a non-circular (polygonal, elliptical, and the like), and by bringing at least two location in the circumferential direction of the inner circumferential surface of the rack bushing 14a in contact with the outer circumferential surface of the rack shaft 9, it is possible to support the rack shaft 9 by the rack bushing such that sliding is possible, while at the same time keeping the rack shaft 9 from tilting with respect to the rack guide 28b.

Furthermore, in this example, the tip end sections (end sections on the rack shaft 9 side) of the holder 30 that are located on both sides of the pressing roller 34 protrude and extend to the rack shaft 9 side further than the outer diameter of the pressing roller 34. The tip end surface of the holder 30 (end surface on the rack shaft 9 side) is a partial cylindrical concave surface that matches the rear surface 29 of the rack shaft 9, and a pair of contact edges 40 that are parallel with the axial direction of the rack shaft 9 and are contact sections that are long in the axial direction of the rack shaft 9 are located at two location on the tip end surface that are separated from each other in the forward-backward direction of the vehicle. These contact edges 40 come in contact with or closely face the rear surface 29 of the rack shaft 9 when the holder 30 is pressed toward the rack shaft 9 by the elastic force of the plate spring 31. These contact edges 40 also restrain movement of the rack shaft 9 in the direction of the thrust load of the pressing roller 34, so the thrust load that is applied to the pressing roller 34 is reduced.

Figure 9:
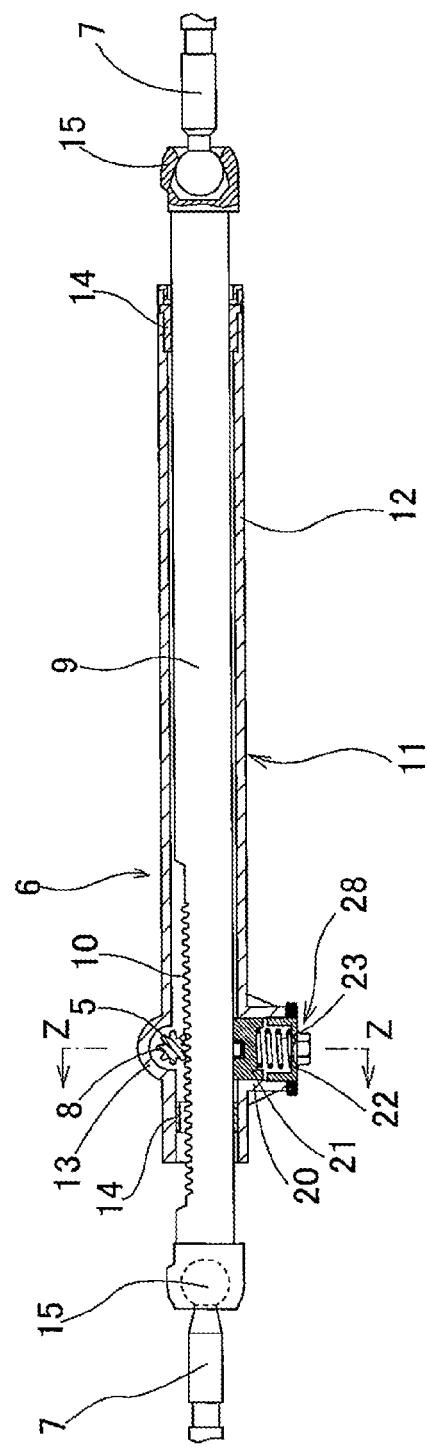
FIG. 9 is a drawing corresponding to the cross-section Y-Y in FIG. 7, and illustrates an example of a conventional rack and pinion of steering gear unit.
Figure 10:
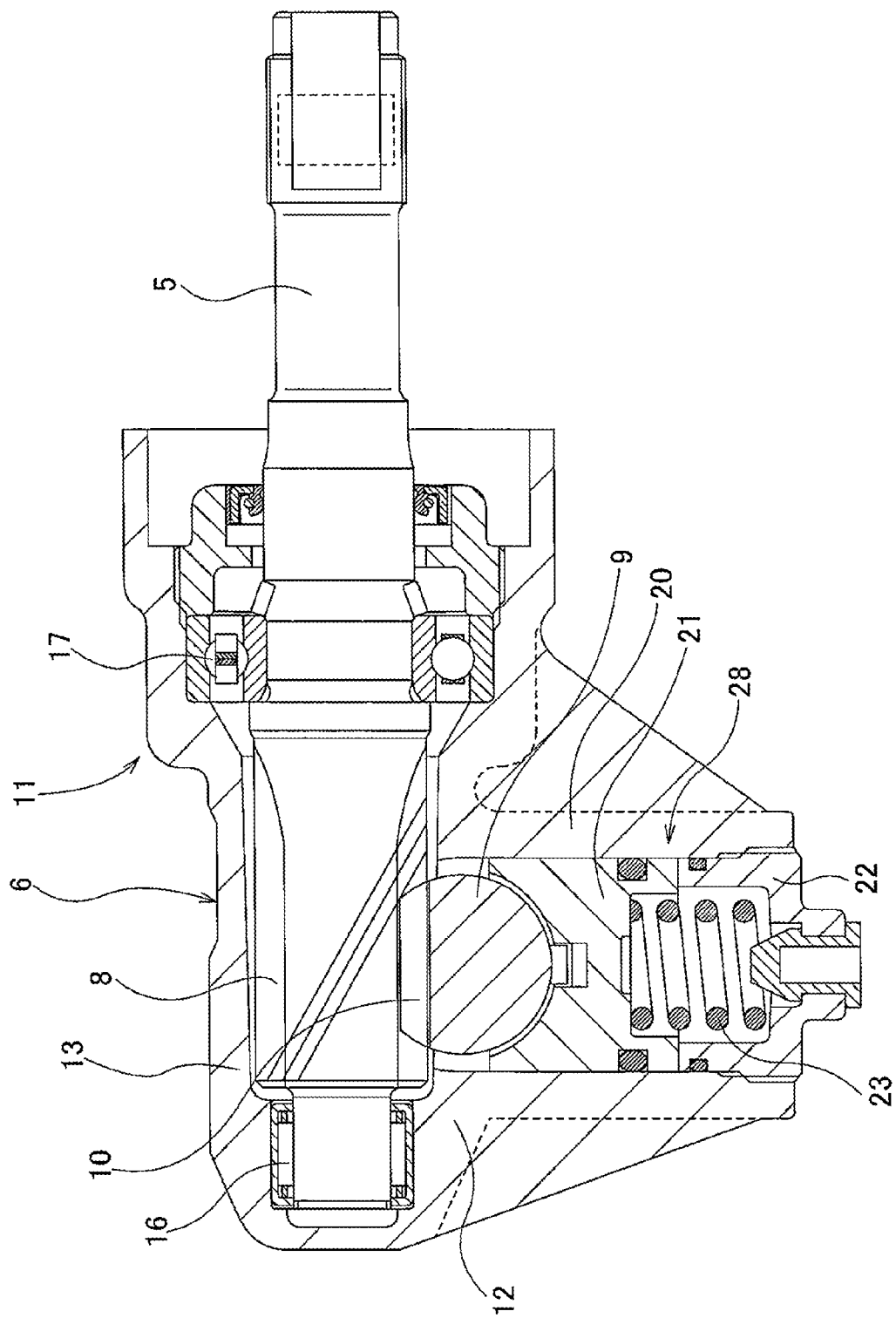
FIG. 10 is a cross-sectional view of section Z-Z in FIG. 9.

In the case of construction that employs the rolling-type rack guide that includes this example, the pressing roller 34 is supported by the holder 30 so that both end sections in the axial direction are supported by the support shaft 33 so as to be able rotate freely. Therefore, when compared to the case of pushing by surface contact the rear surface of the rack shaft 9 toward the pinion shaft 5 by the partial cylindrical concave surface of the pressing block 21 as in construction that employs the sliding-type rack guide 28 illustrated in FIG. 9 and FIG. 10, the width of the area of contact between the outer circumferential surface 36 of the pressing roller 34 and the rear surface 29 of the rack shaft 9 becomes narrow, and the contact state of this area of contact becomes linear contact. Therefore, in the case of the construction of this embodiment, it becomes easy for the rack shaft 9 to tilt with respect to the pressing roller 34 (the rack shaft 9 displaces easily in the axial direction of the pressing roller 34). In this example, the contact edges 40 that come in contact with or closely face the rear surface 29 of the rack shaft 9 prevent the rack shaft 9 from tilting with respect to the holder 30 and pressing roller 34, so it becomes possible to further reduce the thrust load that is applied to the pressing roller 34.

In this example, the pair of contact edges 40 are located further on the pinion shaft 5 side (left side in FIG. 4) than both end section in the axial direction of the pressing roller 34. As described above, the contact section that comes in contact with or closely faces the rear surface 29 of the rack shaft 9 is not limited to the contact edges 40 described above and various constructions can be employed. For example, it is possible to employ construction wherein stepped surfaces that are parallel with the tip end surface of the holder 30 of the rack guide 28b are provided on the rear surface of the rack shaft 9, and the tip end of this holder 30 comes in contact with or closely faces these stepped surfaces.

With the rack and pinion steering gear unit of this example, when compared with the construction of the first example, it is possible to further reduce the thrust load that is applied to the pressing roller 34. For example, in order that the thrust needle roller bearings 35 that are provided between both outside surfaces in the axial direction of the pressing roller 34 and the inside surface of the holder 30 rotate smoothly, minute spaces are formed in the portions between the inside surfaces of the pair of rings of these thrust needle roller bearings 35 and the outer circumferential surfaces of the needles. With this kind of construction, when a thrust load is applied to the pressing roller 34 from the rack shaft 9, the rack shaft 9 and pressing roller 34 may displace or rattle in the axial direction of the pressing roller due to the minute spaces. However, in this example, by providing a rack busing 14a and contact edges 40 on the tip end surface of the holder 30, it is possible to effectively achieve a function of preventing the rack shaft 9 from moving in the direction of the thrust load of the pressing roller 34. In this example, in order to prevent the rack shaft 9 from tilting with respect to the pressing roller 34, both the rack bushing 14a and contact edges 40 are provided, however, construction is also possible in which only one of these is employed.

Moreover, in the case of this example, when assembling the rack guide 28b, the holder 30 can be easily kept in the proper position. In other words, in the case of the construction illustrated in FIG. 11, both end sections in the axial direction of the pressing roller 34 and the tip end surface of the holder 30 are located on the same plane. Therefore, when assembling the rack guide 28a, by tightening the cover (plate spring support) that covers the opening of the cylinder section 20a more than the specified amount, the rack guide 28a rotates with respect to the rack shaft 9, and there is a possibility that it will not be possible to keep the contact state between the pressing roller 34 and the rear surface of the rack shaft 9 in the proper state. On the other hand, in the case of this example, the pair of contact edges 40 is located further on the pinion shaft 5 side than both end sections in the axial direction of the pressing roller 34. Therefore, when assembling the rack guide 28, when the cover 22a is tightened more than the specified amount, the contact edges 40 of the holder 30 coming in contact with the rear surface 29 of the rack shaft 9, so the holder 30 is prevented from rotating with respect to the rack shaft 9. As a result, it becomes possible to easily keep the contact state between the outer circumferential surface 36 of the pressing roller 34 and the rear surface 29 of the rack shaft 9 in a proper state. The other construction and function of the second example of the embodiment are the same as in the first example of the embodiment.

INDUSTRIAL APPLICABILITY

Figure 7:
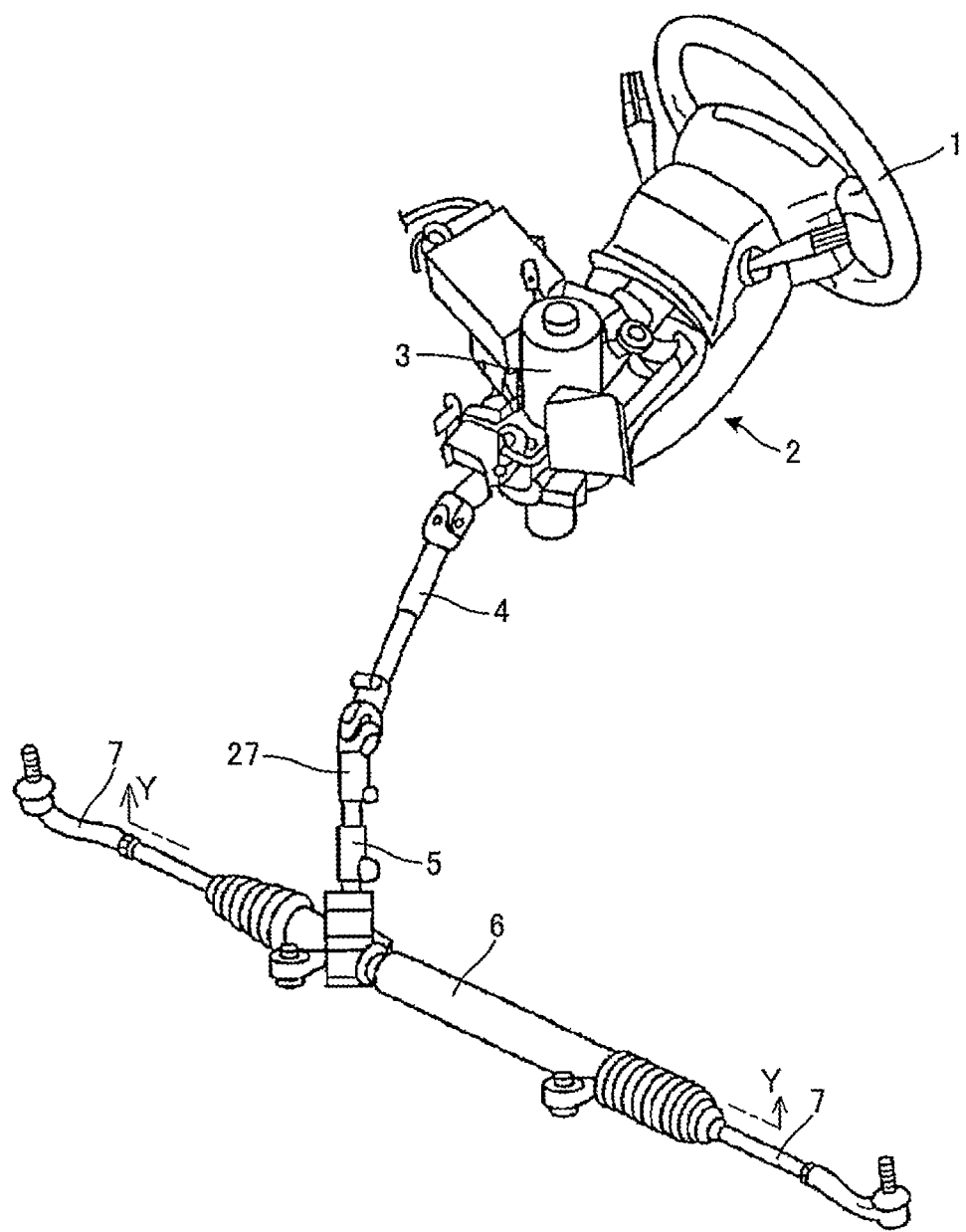
FIG. 7 is a perspective view illustrating a first example of a steering apparatus in which the steering gear unit of the present invention is used.
Figure 8:
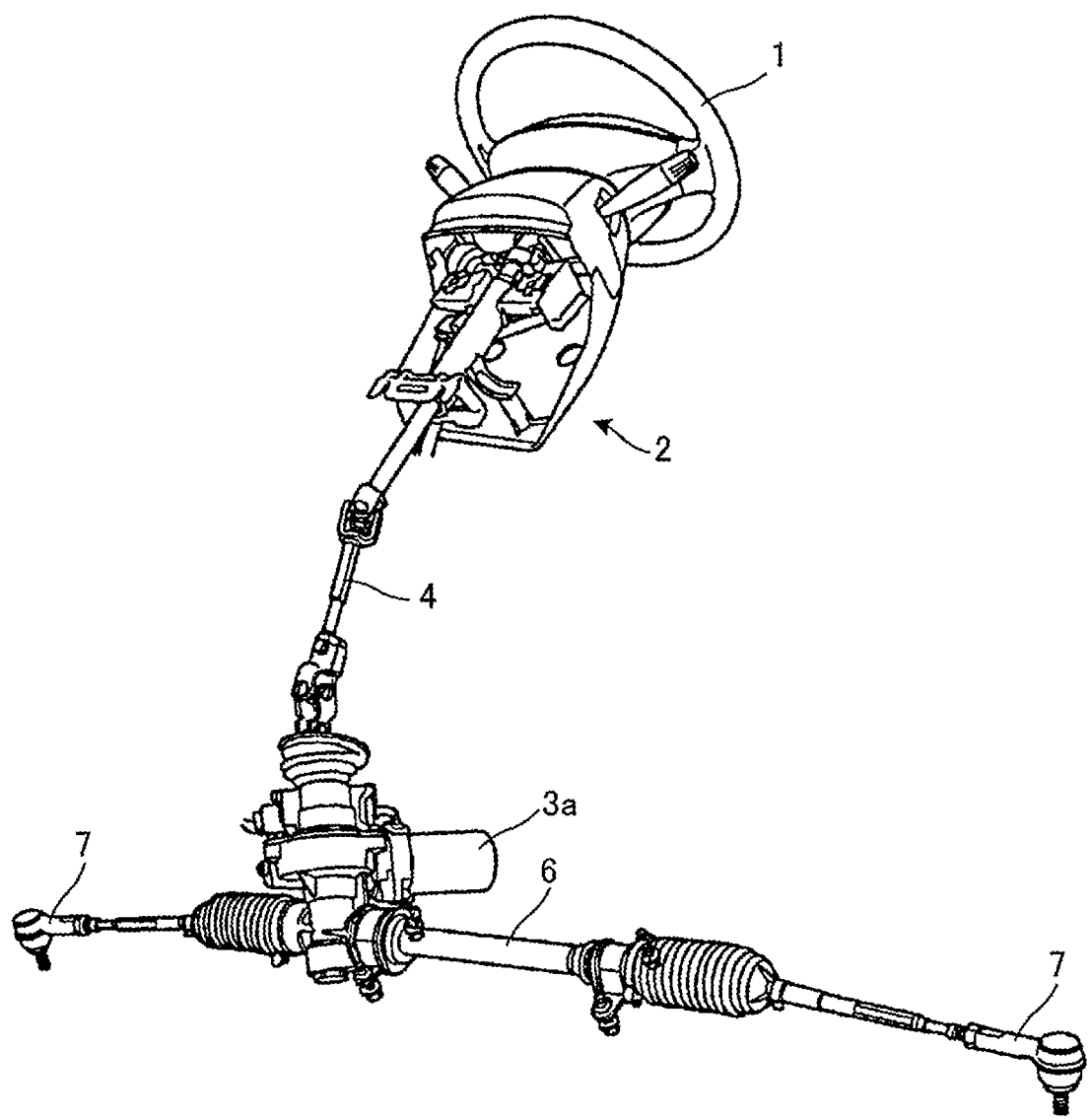
FIG. 8 is a perspective view illustrating a second example of a steering apparatus in which the steering gear unit of the present invention is used.

The rack and pinion steering gear unit of the present invention is not limited to the column assist type rack and pinion power steering apparatus illustrated in FIG. 7, or the pinion assist type rack and pinion power steering apparatus illustrated in FIG. 8, and can also be applied to rack and pinion steering apparatuses that are not provided with an auxiliary operating force from an electric motor.

EXPLANATION OF REFERENCE NUMBERS

1 Steering wheel
2, 2a Steering column
3, 3a Motor
4 Intermediate shaft
5 Pinion shaft
6, 6a, 6b Steering gear unit
7 Tie rod
8 Pinion teeth
9 Rack shaft
10 Rack teeth 11, 11a Housing
12, 12a Main housing section
13 Sub housing section
14, 14a Rack bushing
15 Spherical joint
16 Radial needle roller bearing
17 Ball bearing
18 Thrust metal bearing
19 Radial needle roller bearing
20, 20a, 20b Cylinder section
21 Pressing block
22, 22a Cover
23 Spring
24 Inner circumferential surface
25 Installation flange section
26 Installation hole
27 Universal joint
28, 28a, 28b Rack guide
29 Rear surface
30 Holder
31 Plate spring
32 Support hole
33 Support shaft
34 Pressing roller
35 Thrust need roller bearing
36 Outer circumferential surface
37 Restraining nut
38 Inner circumferential surface
39 Convex section
40 Contact edge

What is claimed is:

1. A rack and pinion steering gear unit, comprising:

a housing that has a main housing section, a sub housing section provided in a skewed position with respect to the main housing, and a cylinder section provided on a radially opposite side of the main housing section from the sub housing section and orthogonal to the main housing section;

a rack shaft that has rack teeth on part of a front surface of the rack shaft, the rack teeth being inclined with respect to a width direction of the front surface, and the rack shaft being located inside the main housing section such that displacement in an axial direction of the rack shaft is possible;

a pinion shaft that has pinion teeth on a half section on a tip end side in an axial direction of the pinion shaft that engage with the rack teeth, and that is located inside the sub housing section such that rotation is possible, the pinion teeth being engaged with the rack teeth and a base section in the axial direction of the pinion shaft protruded outward from an opening of the sub housing section;

a cylindrical rack bushing comprising a plurality of convex sections, each convex section having a smaller diameter than other parts, the convex sections provided at two respective locations radially opposite from each other along an inner circumferential surface of the rack bushing and coming in contact with the rear surface of the rack shaft from both sides of the rack shaft in a width direction of the rack shaft to support the rack shaft on an inside of the rack bushing and permit sliding of the rack shaft, and the rack bushing fastened in part on the inside of the main housing section in a location that is separated from an engaging section between the rack teeth and the pinion teeth, but is near the engaging section; and a rack guide located inside the cylinder section and pressing the rack shaft toward the pinion shaft, the rack guide comprising:

a pressing roller that has an outer circumferential surface that comes in rolling contact with a rear surface of the rack shaft;

a support shaft that supports the pressing roller such that rotation is possible;

a holder that is mounted inside the cylinder section such that movement toward or away from the rack shaft is possible, and supports end sections on both sides in an axial direction of the support shaft;

an elastic member that presses the holder toward the rear surface of the rack shaft;

a radial needle roller bearing that is provided between an outer circumferential surface of the support shaft and an inner circumferential surface of the pressing roller; and a thrust needle roller bearing that is provided between side surfaces on both sides in an axial direction of the pressing roller and an inside surface of the holder.

2. The rack and pinion steering gear unit according to claim 1, wherein the end section on a rack shaft side of the holder extends on both sides of the pressing roller to the rack shaft side further than outer diameter of the pressing roller, and contact sections are formed on the end section on the rack shaft side that extend in the axial direction of the rack shaft and come in contact with or closely face portions on both sides of the pressing roller in the width direction of the rear surface of the rack shaft.

* * * * *